United States Patent
Stansell et al.

(10) Patent No.: US 11,790,158 B1
(45) Date of Patent: *Oct. 17, 2023

(54) SYSTEM AND METHOD FOR USING A DYNAMIC WEBPAGE EDITOR

(71) Applicant: WORLDWIDE CREATIVE TECHNIQUES, LLC, Wilmington, DE (US)

(72) Inventors: Sean C. Stansell, Arbutus, MD (US); Christine A. Miller, Dallastown, PA (US)

(73) Assignee: WORLDWIDE CREATIVE TECHNIQUES, LLC

( * ) Notice: Subject to any disclaimer, the term of this patent is extended or adjusted under 35 U.S.C. 154(b) by 81 days.

This patent is subject to a terminal disclaimer.

(21) Appl. No.: 17/521,731

(22) Filed: Nov. 8, 2021

Related U.S. Application Data (63) Continuation of application No. 16/826,898, filed on Mar. 23, 2020, now Pat. No. 11,170,159, which is a continuation of application No. 13/676,532, filed on Nov. 14, 2012, now Pat. No. 10,614,156.

(51) Int. Cl.
   *G06F 40/166* (2020.01)
   *G06F 40/114* (2020.01)

(52) U.S. Cl.
   CPC .......... *G06F 40/166* (2020.01); *G06F 40/114* (2020.01)

(58) Field of Classification Search
   CPC ........................... G06F 40/166; G06F 40/114
   See application file for complete search history.

(56) References Cited

U.S. PATENT DOCUMENTS

| | | | |
|---|---|---|---|
| 6,802,058 B2 | 11/2004 | Banavar et al. | |
| 7,155,381 B2 | 12/2006 | Ryzl | |
| 7,221,370 B1 | 5/2007 | Arnold et al. | |
| 10,614,156 B1 * | 4/2020 | Stansell | G06F 40/117 |
| 11,170,159 B1 * | 11/2021 | Stansell | G06F 40/114 |
| 2007/0038718 A1 | 2/2007 | Khoo et al. | |

(Continued)

OTHER PUBLICATIONS

Adobe Systems Incorporated, "Using Adobe® Device Central CS5 & CS5.5," last updated Apr. 28, 2011, 55 pages, can be retrieved at <URL:http://help.adobe.com/en_US/devicecentral/cs/using/devicecentral_cs5 help.pdf>.

(Continued)

*Primary Examiner* — Kyle R Stork
(74) *Attorney, Agent, or Firm* — The Belles Group, P.C.

(57) ABSTRACT

Disclosed are technologies for previewing a webpage. A first request comprising a first content layout for the webpage and indicia of one or more first device characteristics corresponding to emulation in a webpage preview may be received. A plurality of first style rules may be generated that may include an indication that at least one of the one or more content items is hidden based on the received indicia of one or more first device characteristics. A user designation regarding a preview status of the at least one hidden content item may be received. A preview of the webpage based on the plurality of first style rules may be rendered. The preview may identify the at least one hidden content item in the preview of the webpage if the preview status is positive, or exclude that content item in the preview if the preview status is negative.

20 Claims, 9 Drawing Sheets

(56) References Cited

U.S. PATENT DOCUMENTS

| | | |
|---|---|---|
| 2010/0037168 A1 | 2/2010 | Thayne et al. |
| 2010/0107056 A1 | 4/2010 | Underhill et al. |
| 2013/0080887 A1 | 3/2013 | Hou |
| 2013/0174012 A1 | 7/2013 | Kwan et al. |
| 2013/0326337 A1 | 12/2013 | Lehmann et al. |
| 2014/0006936 A1 | 1/2014 | Shekey et al. |
| 2014/0250368 A1 | 9/2014 | Wineman |

OTHER PUBLICATIONS

Rhomobile—CSS Framework, http://docs.rhomobile.com/rhodes/css-framework.pdf, 4 pgs.
Rhomobile—RhoStudio, http://docs.rhomobile.com/rhostudio.lutorial, 20 pgs.
Adobe AIR 3 _FAQ_ Frequently asked questions, Nov. 15, 2012, http://www.adobe.com/products/air/faq.html, 3 pgs.
Create Apps for iOS 6—Apple Developer, Nov. 15, 2012, hllps://developer.apple.com/devcenter/ios/checklisl/, 3 pgs.
BBDemo3—Cross Platform iPhone and iPad Web Browser Simulator, Nov. 15, 2012, hllps7/code.google.com/p/ibbdemo3/, 1 pg.
Android Emulator, Nov. 15, 2012, http://developer.android.com/tools/help/emulator.html, 6 pgs.
FAQ I Adobe Edge Inspect, Nov. 15, 2012, http://html.adobe.com/edge/inspecl/faq.html, 2 pgs.
Liz Myers, Automated Testing of Mobile Content, Oct. 15, 2008, http://solutionpartners.adobe.com/designcenter/devicecentral/articles/Irvid4063_dc.html, 7 pgs.
Tito Bottitia, Finding the Look & Feel of BostonGlobe.com, Jan. 30, 2012, http://upstatemenl.com/blog/2012/01/finding-the-look-feel-of-bostonglobe-com/, 17 pgs.
Tito Botiitta, Beer, Serendipity, and the New BostonGlobe.com, Sep. 12, 2011, http://upstatemenl.com/blog/2011 /09/beer-serendipity-and-the-new-bostonglobe-com/, 6 pgs.
Tito Bottitia, How to Approach a Responsive Design, Jan. 26, 2012, 2http://upstatemenl.com/blog/2012/01/how-to-approach-a-responsive-design/, 29 pages.
Dominion Dealer Solutions, New Adaptive Websites, 1 pg.
Dominion Dealer Solutions, Future Proof Your Website, How to Prepare for the New Trends in Car Shopping, 6 pgs.

\* cited by examiner

SYSTEM AND METHOD FOR USING A DYNAMIC WEBPAGE EDITOR

CROSS REFERENCE TO RELATED APPLICATION

This application is a continuation of U.S. patent application Ser. No. 16/826,898, filed Mar. 23, 2020, which issued as U.S. Pat. No. 11,170,159 on Nov. 9, 2021, which is a continuation of U.S. patent application Ser. No. 13/676,532, filed Nov. 14, 2012, which issued as U.S. Pat. No. 10,614,156 on Apr. 7, 2020, the entire disclosures of all of which are incorporated herein by reference as if fully recited herein, for all purposes.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Certain terminology is used herein for convenience only and is not to be taken as a limitation on the embodiments of the present disclosure. In the drawings, the same reference letters are employed for designating the same elements throughout the several figures.

The words "right", "left", "lower" and "upper" designate directions in the drawings to which reference is made. The words "inwardly" and "outwardly" refer to directions toward and away from, respectively, the geometric center of the dynamic webpage editor system and designated parts thereof. The terminology includes the words above specifically mentioned, derivatives thereof and words of similar import.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments.

There are an increasing number of different device types accessing webpages via the Internet. The diversity among the capabilities and configuration of these devices places a burden on web page developers tasked with ensuring that webpages are accessible across the various devices. Moreover, the look and feel of any given webpage should be optimized for display on the device that is requesting the page. To address these issues, a group of web design techniques, collectively referred to as "Dynamic Webpage Design", have emerged. The term Dynamic Webpage Design, as used herein, is intended to generally refer to design techniques which adapt a webpage based on the software and hardware capabilities of the device requesting the webpage, as well as design techniques which respond to actions made by an individual viewing the webpage on the device. For example, a webpage may be designed using Dynamic Webpage Design techniques to adapt to the display resolution of the device requesting the webpage with a particular selection of fonts or images. In addition, the webpage may be designed using Dynamic Webpage Design techniques to respond to a user resizing the webpage by rearranging content items or adjusting font sizes.

Dynamic Webpage Design principles seek to optimize a webpage based on a "display context" associated with the device requesting the page, including the supported software features, configuration, and/or hardware specifications of the device. While there are a variety of characteristics associated with the accessing device that may be generally relevant to defining a display context, there are generally four types of device characteristics that are especially relevant in the design of dynamic webpages: viewport characteristics, hardware specifications, interface options, and the type of connection used by the device when accessing the webpage. Viewport characteristics refer to device characteristics such as display size and resolution which indicate how an item will appear when displayed on the webpage. Hardware specifications such as processor speed and memory size define the degree to which a device can display large and/or complex data items in a manner that does not degrade a user's experience when viewing a webpage on the device. Interface options indicate how a user interacts with the webpage (e.g., via mouse, keyboard, voice, game controller, and/or a touch screen). Finally, the type of connection indicates the connectivity of the user (e.g., broadband, Wi-Fi, 3G, LTE, etc.) and, thus, specify how fast the user can receive content from a web server hosting the webpage.

For individuals creating webpages using Dynamic Webpage Design techniques, it can be challenging to ensure that a webpage will be presented as desired across a variety of display contexts. In particular, it may be time-intensive and expensive to test a webpage across different display contexts. To address these and other issues related to Dynamic Webpage Design, described herein are methods and systems for creating and modifying dynamic webpages in a webpage editor.

Referring to the drawings in detail, wherein like numerals indicate like elements throughout, there is shown in FIGS. 1-9 several embodiments of a Dynamic Webpage Editor ("DWE") system, generally designated 100, in accordance with the present disclosure for providing a view of how a webpage will be displayed or what it will look like on a device according to the device's supported software features and hardware specifications. The DWE system 100 enables a user to create, view, and modify webpages using Dynamic Webpage Design principles to optimize presentation and interaction based on the configurations, supported software features and hardware specifications of the requesting device. In some embodiments, the DWE system 100 utilizes a graphical user interface that allows the user to, for example, view and modify the webpage and its constituent components according to various device characteristics. Moreover, those skilled in the art will recognize that the DWE system 100 is applicable to the creation, viewing, display, and, modification of webpages for presentation on computing devices including, without limitation, desktop computers, mobile phones (including smartphones), tablet devices, gaming systems, and televisions.

Figure 1:
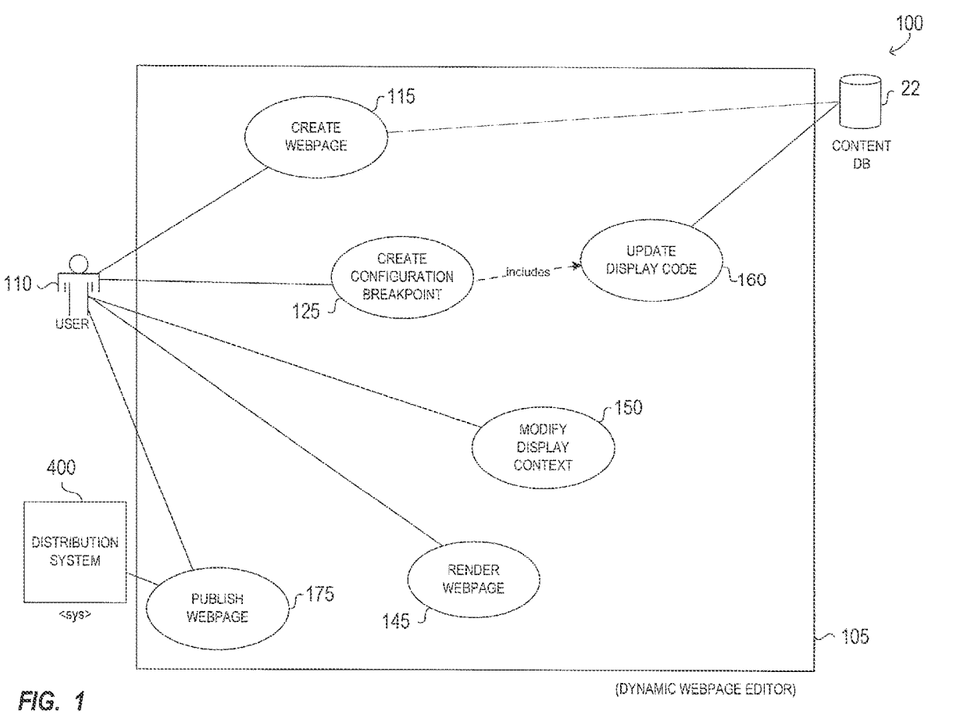
FIG. 1 is a use case diagram of an dynamic web editor system in accordance with multiple embodiments of the present disclosure.

FIG. 1 is a use-case diagram for the DWE system 100 and associated systems and actors in accordance with one embodiment of the present disclosure. Referring to FIG. 1, the DWE system 100 includes a DWE 105. A user 110 interacts with the DWE 105 to create, edit, and publish websites. The user 110 may be an individual or group of persons, business entity, organization, or generally any entity seeking to create, edit, and/or publish websites.

The DWE 105 includes a create webpage use case 115 for creating a new webpage or editing an existing webpage. In some embodiments, the webpage does not contain any content and the create webpage use case 115 merely begins with a blank webpage that is customizable by the user 110. In other embodiments, the create webpage use case 115 creates a webpage based on a template provided by or selected by the user 110. For example, a corporate entity may have templates which define a basic webpage structure that is utilized for all webpages generated for that entity. In addition, some embodiments allow the user 110 to submit options when creating a webpage. Based on these options, the create webpage use case 115 customizes one or more layout elements of the webpage. For example, if the user 110 provides an option that specifies a three column layout for a webpage, the create webpage use case 115 will divide the created webpage into three separate portions that can be independently designed by the user 110. To support Dynamic Webpage Design, the webpage may be configured with a fluid grid. As those skilled in the art would recognize, fluid grids use percentages rather than pixels in defining the layout of the page. This allows the webpage to, for example, adjust the size and position of content on the webpage based on the available size of the rendering device's viewport. The create webpage use case 115 may interact with a content database 22 for storing the webpage or loading an existing webpage, webpage template or content items. It should thus be understood that the create webpage use case 115 may be used to edit or modify an existing webpage. Thus, in some embodiments, the create webpage use case 115 allows the user 110 to edit an existing webpage previously created and stored in the content database 22.

In connection with the create webpage use case 115, the user 110 may customize the webpage by adding, removing, or modifying one or more content items associated with the webpage. Those skilled in the art will recognize that a content item includes any constituent portion of a website. For example content items may include, without limitation, text, images, videos, source code (e.g., HTML), hyperlinks, scripts, and style definitions (e.g., specified using CSS). In addition, any options associated with the content items on the webpage may be specified or modified as well. These options may include, for example and without limitation, text font/size, content item placement, content item resizing behavior, and an indication of whether a content item should be shown or hidden in a particular display context. For example, the user 110 may specify that the placement of text associated with contact information may be located at the lower portion of the webpage when displayed at a viewport size commensurate with a desktop computer, while the contact information should be placed at the top of the page when displayed at a viewport size commensurate with a mobile device. In some embodiments, the DWE 105 also allows the user 110 to define the navigation properties for the webpage at a display context. For example, the user 110 may configure the webpage so that a navigation bar which spans the entire site for large screen sizes may be replaced by buttons on devices with smaller screen sizes. In addition, the actions associated with content items may be varied based on the requesting device characteristics. For example, clicking on a "Contact Us" link on the website may cause the device to dial a phone number associated with the site if phone calling functionality is available on the device. If phone calling functionality is not available, the link may redirect the device to a form for submitting questions to the website owners.

Following creation of a webpage or modification of an existing webpage, a render webpage use case 145 included in the DWE 105 renders the webpage using the most recent content items provided by the user 110. If desired, the user 110 may then modify the webpage, for example, by adding or removing content items, rearranging the layout of the webpage, or changing one or more style sheet rules associated with one or more content items.

The render webpage use case 145 may use any technique known in the art to render and present the webpage to the user. In some embodiments, the user 110 is allowed to directly create, view or preview, and/or modify webpages inside a web browser. In other embodiments, render webpage use case 145 renders the webpage into a window which provides a simulation and/or emulation of one or more characteristics of a device accessing the page. For example, in some embodiments, a device emulator window executes a computer program which provides an imitation of a device executing code commensurate with displaying the webpage. Other embodiments only emulate certain device features or characteristics related to displaying a web page on the device (e.g., screen height or screen width). In yet other embodiments, rather than emulating a device, simulation techniques are used to simulate an abstract model of a particular device configuration. The degree to which the emulation window replicates device behavior may be dependent on the options specified by the user. Thus, in some embodiments, the options section may only include options related to the size of the viewport (e.g., screen height and width). In such cases, because the DWE 105 is not required to emulate or simulate any hardware functionality, the emulation window may execute machine code commensurate with a particular web browser or with a generic web browser. For example, the emulation window may execute code from Google's open source Webkit software to display a browser window which emulates and/or simulates features related to Google's Chrome web browser. In some embodiments, the emulation window also provides a simulation and/or emulation of the borders of a web browser window, include items such as the window frames, menus, toolbars and scroll bars. For example, with reference to FIG. 2, an emulation window 260 is shown that includes a fictional browser 240 with a back button, a forward button, and a text field for specifying a URL ("http://www.mysite.com").

The DWE 105 includes a create configuration breakpoint use case 125 which allows the user 110 to create a configuration breakpoint based on the webpage currently displayed and the current display of context information. Those skilled in the art will recognize that configuration breakpoints are generally understood to refer to a set of content items options and/or rules for defining how a webpage should be displayed in a particular display content or in a range of display contexts. For example, a configuration breakpoint may be defined for all devices with display sizes between 400 pixels and 800 pixels. This configuration breakpoint may include style sheet rules which indicate a particular font size to be used for requesting devices with these display sizes. The configuration breakpoint may also define the layout of content items on the webpage. For example, with reference to FIG. 2, the webpage 200 contains content items including an image 255, a column of menu items 260 and a content block 260 arranged in a particular layout. This layout, along with any additional information associated with the content items (e.g., actions to take based on user interactions with a particular content item), are collectively defined as a "configuration breakpoint" associated with the content options shown in the options section 250. In some embodiments, the configuration breakpoint is automatically created as the user 110 interacts with the DWE 105. In other embodiments, the user must explicitly request that the DWE 105 create a new configuration breakpoint by, for example, clicking a save button 235 on the DWE 105.

Continuing with reference to FIG. 1, a configuration breakpoint created via the create configuration breakpoint use case 125 may be saved to the content database 22. Saving may occur automatically by the DWE 105 or through user 110 interaction with the DWE 105 (e.g., via the Save button 235 illustrated in FIG. 2). A configuration breakpoint is saved by storing any information required to reproduce it when the webpage is requested with a particular configuration breakpoint. For example, one or more media queries may be created or modified and stored in the style sheets associated with the webpage. These media queries will then allow the configuration breakpoint to be replicated on a device presenting the webpage. In addition, in some embodiments, the DWE 105 creates a record in the content database 110 specifying the association between a configuration breakpoint and any modifications to the content items and/or style sheets associated with the webpage. In this manner, the user 110 can load the configuration breakpoint into the DWE 105 at a later time if further modifications to the webpage are necessary.

In some embodiments, the DWE 105 utilizes one or more predefined configuration breakpoints. These predefined configuration breakpoints may be used in addition to, or as an alternative to, the configuration breakpoints created via the create configuration breakpoint use case 125. The predefined configuration breakpoints may correspond to a set of content item options and/or rules which define how a webpage would be displayed on specific devices. For example, the DWE 105 may include a predefined configuration breakpoint corresponding to the display context of a popular smartphone model. In addition, the predefined configuration breakpoints may be defined more generically, for example utilizing display dimensions and/or resolutions which are known to be used across a range of specific devices.

An update display code use case 160 creates or modifies the display code (e.g., commands, rules, and/or definitions for displaying content such as images and text) associated with the webpage. In some embodiments, the update display code use case 160 creates one or more script files with source code for supporting one or more display contexts. These script files may include client-side scripts embedded within the source code of the webpage and written in programming languages including, without limitation, JavaScript and VBScript. For example, the script files may be embedded within the HTML or XHTML document associated with the webpage. Alternatively, the scripts may be specified in a separate file which is referenced by the document associated with the webpages. The update display code use case 160 may also generate server-scripts designed to be executed when a user requests one or more documents associated with the webpage. Such server-side scripts may be written in any language known in the art including, without limitation, ASP.NET, Java, Perl, PHP, and server-side VBScript.

In some embodiments, the update display code use case 160 creates one or more style definitions for supporting one or more display contexts, for example, using a style sheet language such as Cascading Style Sheets (CSS). Style definitions allow the user to specify stylistic rules defining items such as the colors, fonts, and layout used for presenting a webpage. The style definitions may be embedded within the HTML or XHTML document associated with the webpage or, alternatively, the definitions may be specified in a separate file which is referenced by the document associated with the webpages. In some embodiments, one or more style definitions may be associated with a media query. As would be understood by one skilled in art, media queries allow webpage developers to customize the look of a webpage on a receiving device based on that device's display characteristics. Thus, for example, the update display code use case 160 may create a media query including a group of style definitions that are to be used for devices with a viewport display area between 400 px and 800 px.

The DWE 105 includes a modify display context use case 150 which allows the user to modify one or more characteristics of the display context. The degree to which the user 110 may modify the display context may be dependent on the display environment used by the render webpage use case 145 to present the webpage in the DWE 105. For example, modifying some characteristics of the display context may require use of emulation and/or simulation techniques.

To support changes by the user with respect to the viewport, the modify display context use case 150 may allow the user to modify device characteristics such as screen height, screen width, and/or resolution of the webpage presented in the DWE 105. In some embodiments changing the viewport is effectuated by a resize command provided by the user 110. The user 110 may provide the new size to the DWE 105 in a variety of ways. For example, with reference to FIG. 2, the DWE 105 may include a screen height field 210 and a screen width field 215 that allow the user 110 to specify new size dimensions for the webpage 200. Size values may be provided using pixel values or any other size measurement known in the art. In some embodiments, rather than inputting display size values in the screen height field 210 and a screen width field 215, the user 110 can resize by the webpage 200 using a "click-and-drag" technique wherein the user clicks portion of the webpage 200 and drags it (e.g., using a mouse 1044) to resize the webpage 200. In other embodiments, input from peripheral devices is used to resize the webpage. For example, a scroll wheel included on a mouse can be used to increase or decrease the size of the webpage 200 based on scroll direction. Once the user 110 has specified the new display size using any of the techniques listed above, the webpage may be instantly (e.g., in real-time or near real-time) resized to the new display size. Alternatively, the user may be required to click an "Update" button 230 on the DWE 105 to update the display size of the webpage 200 in the DWE 105.

Continuing with reference to FIG. 1, in embodiments where the emulation and/or simulation techniques are used by the DWE 105, the modify display context use case 150 allows the user 110 to modify characteristics corresponding to the simulated and/or emulated hardware of the requesting device. For example, with reference to FIG. 2, the DWE 105 may include fields for inputting processor speed 221 and memory size 222. Modifying the hardware characteristics may effectuate an increase or decrease in responsiveness of the webpage presented in the DWE 105. In some embodiments, if the user 110 sets processor speed and/or memory size below a threshold value delays are introduced to simulate a lower responsiveness for the page. In addition, changes to the hardware characteristics effectuated by the modify display content use case 150 may affect individual webpage items displayed in the webpage presented in the DWE 105. For example, streaming content items may not be displayable below a particular threshold value for processor speed and/or memory size.

In embodiments where the emulation and/or simulation techniques are used by the DWE 105, the modify display context use case 150 may allow the user 110 to change the type of interface simulated and/or emulated within the DWE 105 for interaction with the webpage. For example, with reference to FIG. 2, the DWE 105 includes a dropdown menu 223 which includes interfaces such as, without limitation, mouse, keyboard, voice, game controller, and/or a touch screen. A user's selection of an interface changes how the user can interact with the webpage. For example, for a mouse interface, the user 110 could use a mouse peripheral to interact with the page. If the user selects an interface without any corresponding peripheral on the user's device, a simulated interface may be used in the interface window. For example, if the DWE 105 is used to develop webpages on a device lacking a touch screen and the user selects touch screen in the dropdown menu 223, a simulated "touch" may be effectuated based on the user's mouse movements and/or mouse clicks. It should also be noted that a change to the interface type may also, in turn, display how the webpage 200 appears via the present webpage use case 150. For example, some webpages include links which are only identified when the user moves the mouse pointer over a webpage element (e.g., changing the color a portion of text). Such links may go unnoticed in an environment that solely uses a touch screen interface. Consequently, the link may be modified to more prominently identify it as a hyperlink on the page (e.g., by changing color and/or underlining text corresponding to the link) when the requesting device is utilizing a touch screen interface. Such modifications may occur as the result of input from the user 110 or be effectuated automatically by the DWE 105 based on a selected interface type.

In some embodiments, the modify display context use case 150 allows the user to change the type of connectivity used by the simulated and/or emulated device. For example, with reference to FIG. 2, the DWE 105 may utilize a dropdown menu 223 which includes connectivity types such as, without limitation, analog (e.g., "dial-up"), ISDN, B-ISDN, DSL, Cable, T-1, T-3, OC3, Satellite, 3G, WiMax, and LTE. The menu 223 may also include other variations on these connectivity types such as, for example, a Wi-Fi over a Cable connection. Modifying the connectivity type may result in the introduction of delays in receiving data and interacting with data within the emulation window 260.

The DWE 105 also includes a publish webpage use case 175 which allows the user 110 to transfer files associated with a website to a distribution system 400 such as a web server. In some embodiments all files associated with the webpage are transferred to the distribution system 400 for publication. In other embodiments, the user 110 may select a subset of the files, or a subset of the content within the files, for publication on the distribution system 400. For example, the user 110 may indicate that CSS rules associated with touchscreen devices do not need to be copied to the distribution system 400. This will allow the size of the files that must be downloaded by a requesting device to be reduced, thus allowing for quicker retrieval of the webpage by the device with some sacrifice in the robustness of device support.

In some embodiments, the publish webpage use case 175 allows the user 110 to transfer multiple versions of the webpage and/or multiple versions of individual webpage elements to test the effectiveness of a particular design in gathering a desired response from a webpage visitor. For example, the publish webpage use case 175 may transfer two versions of a webpage that include similar content but vary according layout, color, font size, and/or image use. The distribution system 400 may then use techniques such as A/B Testing and Multivariate Testing to gather analytics regarding how the user interacted with the webpage. These analytics may then be returned to the DWE 105 and used to provide suggestions to the user 110 for modifications to existing webpages or default settings for new webpages. For example, if the DWE 105 determines that webpages with a particular font size receive more interaction from viewers, the DWE 105 may adjust default content style rules or layouts to ensure that other webpages associated with the website utilized the particular font size.

Figure 2:
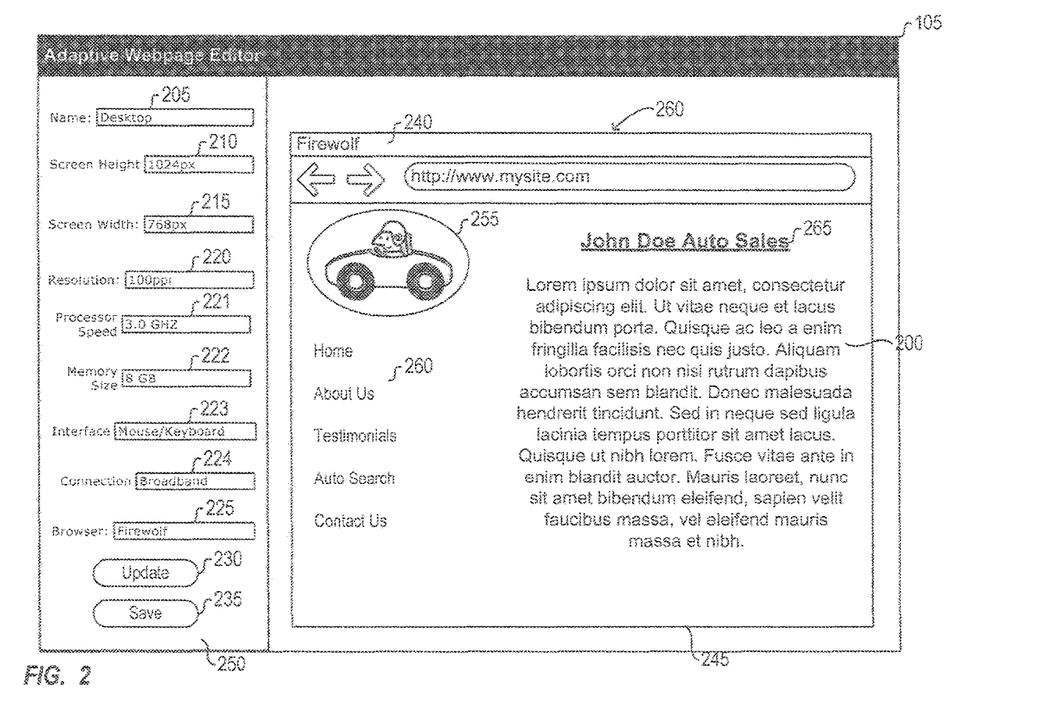
FIG. 2 is an example of a user interface for the dynamic web editor system of FIG. 1.

FIG. 2 shows an example of a DWE 105 in accordance with one embodiment of the present disclosure. In the example of FIG. 2, the DWE is divided into two sections: an options section 250 and a webpage preview section 245. The options section 250 allows the user to input information related to a group of device characteristics, while the webpage preview section 245 includes an emulation window 260 which emulates a webpage 200 according to the values entered in the options section 250. It should be noted that the example of the DWE 105 displayed in the FIG. 2 is merely one example of a possible DWE configuration in accordance with the present disclosure. For example, in some embodiments, the options section 250 is not present and the user enters data regarding configuration options via other techniques such as input into a menu system or dialog boxes associated with specific content items displayed in the emulation window 260.

The options section 250 of FIG. 2 includes a file name field 205 for specifying a name to associate with a particular option configuration. In the example of FIG. 2, the configuration is defined according to values entered by the user 110 into a screen height field 210, a screen width field 215, a screen resolution field 220 a processor speed field 221, a memory size field 222, an interface field 223, a connectivity field 224, and a browser type field 225. Data may be entered into these fields using any technique known in the art. For example, for fields typically associated with a numeric value (e.g., screen height, width, and resolution), the user may enter the numeric value directly. The DWE 105 may use a default unit system for the entered numeric value (e.g., pixels) or, alternatively, the user 110 may enter the units associated with the numeric value directly into the option field. The DWE 105 may also use dropdown lists which allow the user 110 to select a configuration item from a group of configuration items. For example, for the interface field 223 of FIG. 2, a dropdown may be presented with values for "3G", "LTE", and "Cable." In this manner, the DWE 105 can limit the options entered by the user based on the emulation functionality supported by the DWE 105.

In the example of FIG. 2, the webpage preview section 245 in the DWE 105 includes an emulation window 260 which displays the webpage 200 using any number of simulation and/or emulation techniques known in the art. The emulation window 260, and consequently the display of the webpage 200, may be updated in several different ways. In some embodiments, the user 110 enters values in the option section 250 of the DWE 105 and clicks and "Update" button 230 to update the display of the emulation window 260. Alternatively, the emulation window 260 may be automatically updated as the user 110 enters values in the fields in the options section 250. In other embodiments, the user 110 may directly interact with the emulation window 260 to modify the display of the webpage 200. For example, the user 110 may resize the emulation window by clicking on a portion of the window 260 and dragging it to a preferred height and width. Alternatively, when the DWE 105 is configured to emulate a touch-screen interface, the user 110 may resize the emulation window with a touch-based technique such as pinch-and-zoom. In this manner, the user 110 can quickly see how the webpage 200 changes for a various display sizes.

Continuing with reference to FIG. 2, the DWE 105 includes a Save button 235 which allows the user 110 to save the content and/or layout of the website, along with any options provided by the user 110, as a configuration breakpoint. In some embodiments, one or more files are created to support a particular configuration breakpoint. Such files may be named according to the text specified by the user 110 in the name field 205. For example, with reference to FIG. 2, a CSS file named "Desktop.css" may be generated which allows the display of the webpage 200 to be replicated for the screen height, width, and resolution, specified in the options section 250.

Figure 3:
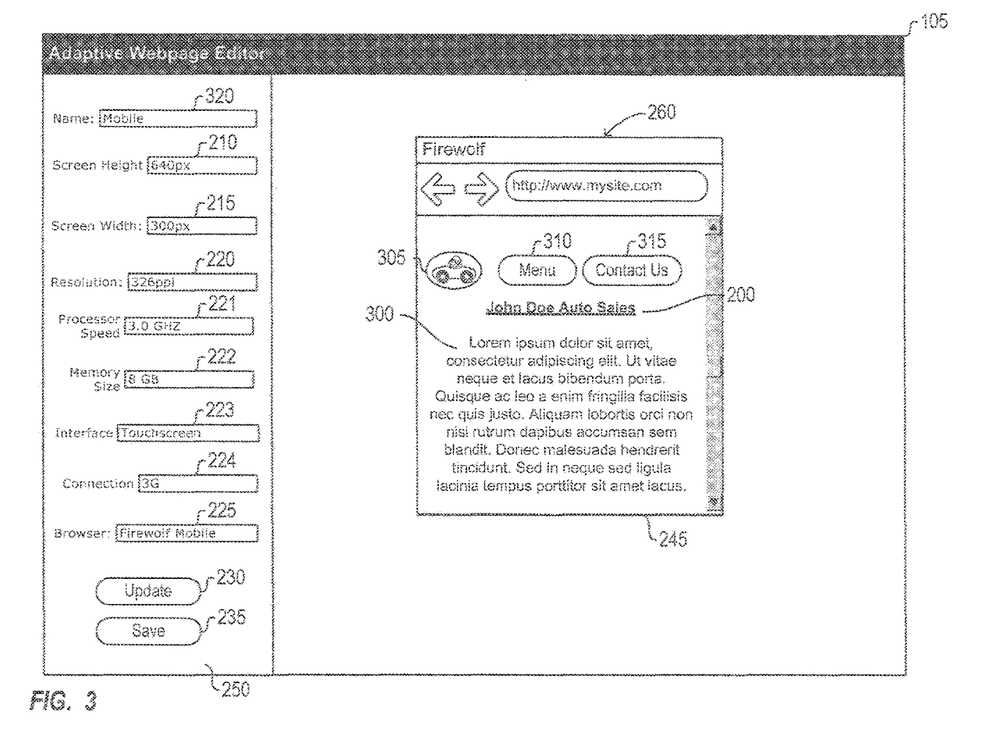
FIG. 3 is an example of a user interface for the dynamic web editor system of FIG. 1.

FIG. 3 provides an example of how the webpage 200 of FIG. 2 may be displayed after the emulation window 260 is updated based on one or more configuration options specified by the user in the options section and/or any resizing done by the user 110 directly in the emulation window 260. The webpage 200 displayed in FIG. 2 includes several examples content elements including an image 255, a menu 260, and a block of text 265. In FIG. 3, the image 255 has been scaled to produce a smaller version 305 of the same image. Similarly, the width of the text block 260 has been reduced along with the font size of the text to produce a smaller block of text 300. The menu 260 of FIG. 2 has been replaced in FIG. 3 with a button 310 that may display, for example, a dropdown listing of one or more of the menu items displayed in the full menu 260 of FIG. 2. In addition, a separate button labeled "Contact Us" 315 has been created in the webpage 200 displayed in FIG. 3. This button 315 may link to the same information resource (e.g., webpage) as the "Contact Us" item in the menu 260 of FIG. 2. Alternatively, the functionality of the "Contact Us" button 315 may be adjusted based on the configuration options specified in the options section 250 of the DWE 105. For example, if the user specifies options indicating mobile phone calling functionality, the "Contact Us" button 315 may be linked to a phone dialer application (e.g., simulated or emulated in the emulation window 260).

Figure 4:
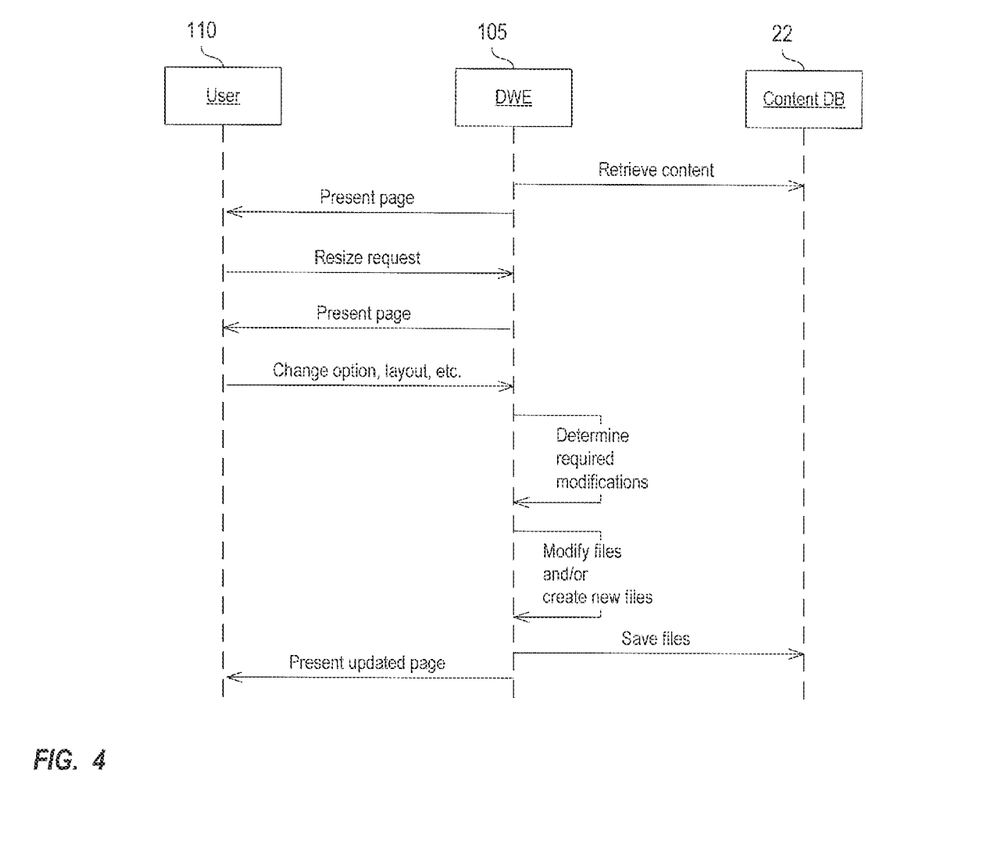
FIG. 4 is a sequence diagram of one embodiment of user modification of a webpage in accordance with the dynamic web editor system of FIG. 1.

FIG. 4 is a sequence diagram showing an example of the interactions of the user 110 and the DWE 105 according to one embodiment of the present invention. First, the DWE 105 retrieves content from the content database 22 and presents that content in the emulation window 260 using the current display context. Next, the user 110 submits a resize request, for example by clicking and dragging the emulation window 260 to a smaller size. This change in size modifies the display context of the webpage and, consequently, the DWE 105 presents an updated webpage corresponding to the new display context in the emulation window 260. Then, the user 110 is given the opportunity to modify the page by, for example, adding or removing content items to the page, changing an option associated with any content item on the webpage, or adjusting the layout of the webpage. In some embodiments, the user 110 directly interacts with the DWE 105 to submit a modification to the page. For example, the user may adjust the placement of text on the webpage by dragging it to a different section of the webpage. After the user 110 submits these changes to the DWE 105, it then determines what, if any, modifications are required to be made to the content files. Any required modifications are made to the content files and new content files are created as necessary. The files are then saved to the content database 22. Finally, the user 110 is presented with an updated page in the emulation window 260 so that the user 110 may verify that the webpage is configured as desired. It should be noted that this process may be repeated iteratively. For example, the user 110 may continually resize the webpage and view the page at a variety of sizes to ensure that it scales as desired across a range of dimensions. The user does not need to submit any changes to a webpage if the web page is configured as desired by user 110 at a particular display context. To continue with the previous example, the user 110 continually resizes the webpage and only modifies the webpage as needed.

Figure 5:
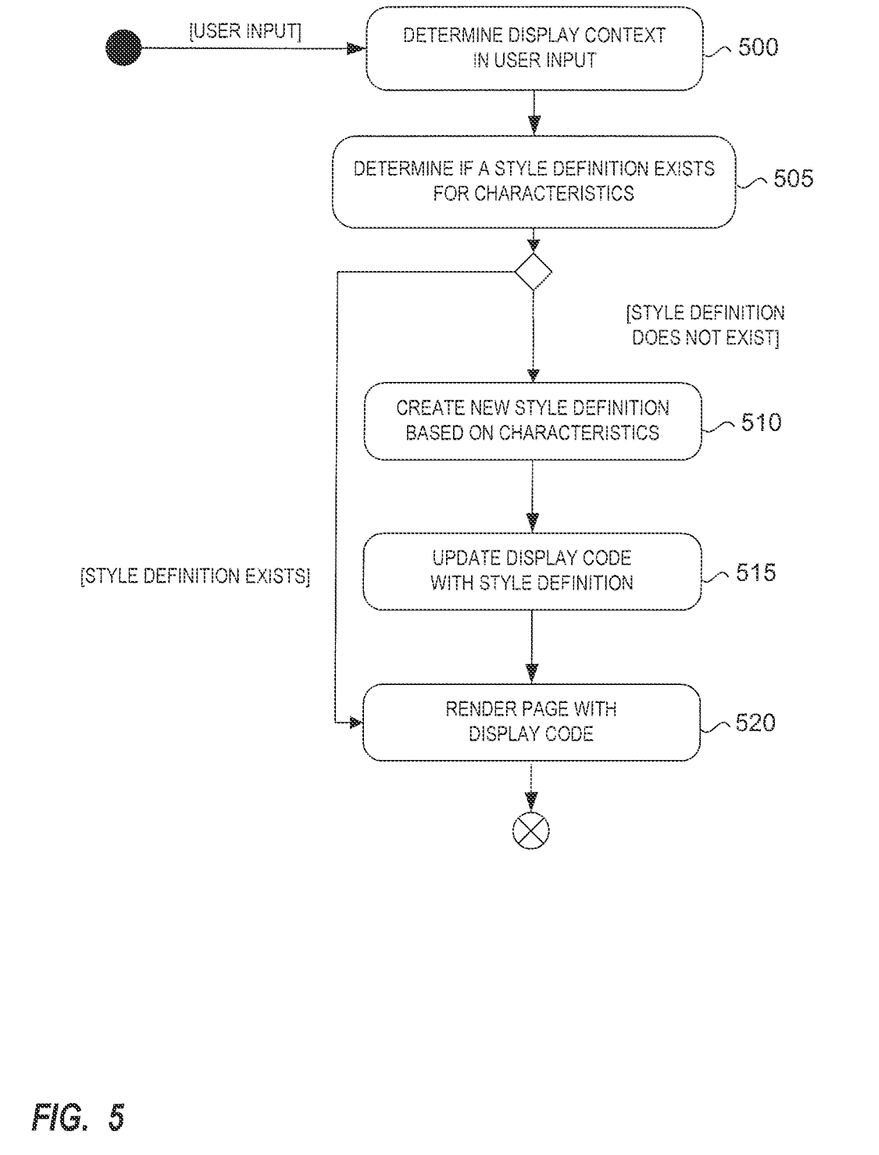
FIG. 5 is an activity diagram of rendering a page with a dynamic web editor system in accordance with multiple embodiments of the present disclosure.

FIG. 5 is an activity diagram illustrating an example workflow for dynamically creating or updating a style definition in response to user interaction with the DWE 105 according to one embodiment. At 500, the display context of the webpage is determined based, for example, on the user input to the DWE 105. Next, at 505, the DWE 105 determines whether a style definition corresponding to the display context exists in the display code associated with the webpage. As noted previously, in some embodiments, style definitions may be limited to a range of values based, for example, on a media query defined by the user 110. Thus, step 505 may entail determining whether one or more values corresponding to the display context are within a particular range of values associated with a media query. If a suitable style definition is found in the display code, the page is rendered by the DWE at 520. However, if a suitable style definition is not found, then a new style definition is created at 510 for the values associated with the display context. In some embodiments, the user 110 may specify that a media query should be created and limited to a subset of the items associated with a display context. For example, the user may specify that the media query should be created only based on the display size characteristics associated with a particular display context. Once the style definition is created, at 515, display code associated with the website modified to include the query. This modification may entail modifying existing style definitions or creating new style definitions in an existing file or, alternatively, creating a new file and any necessary references to associated the new file with existing display code. Finally, at 510 the webpage is rendered for the user with the updated style definitions.

Figure 6:
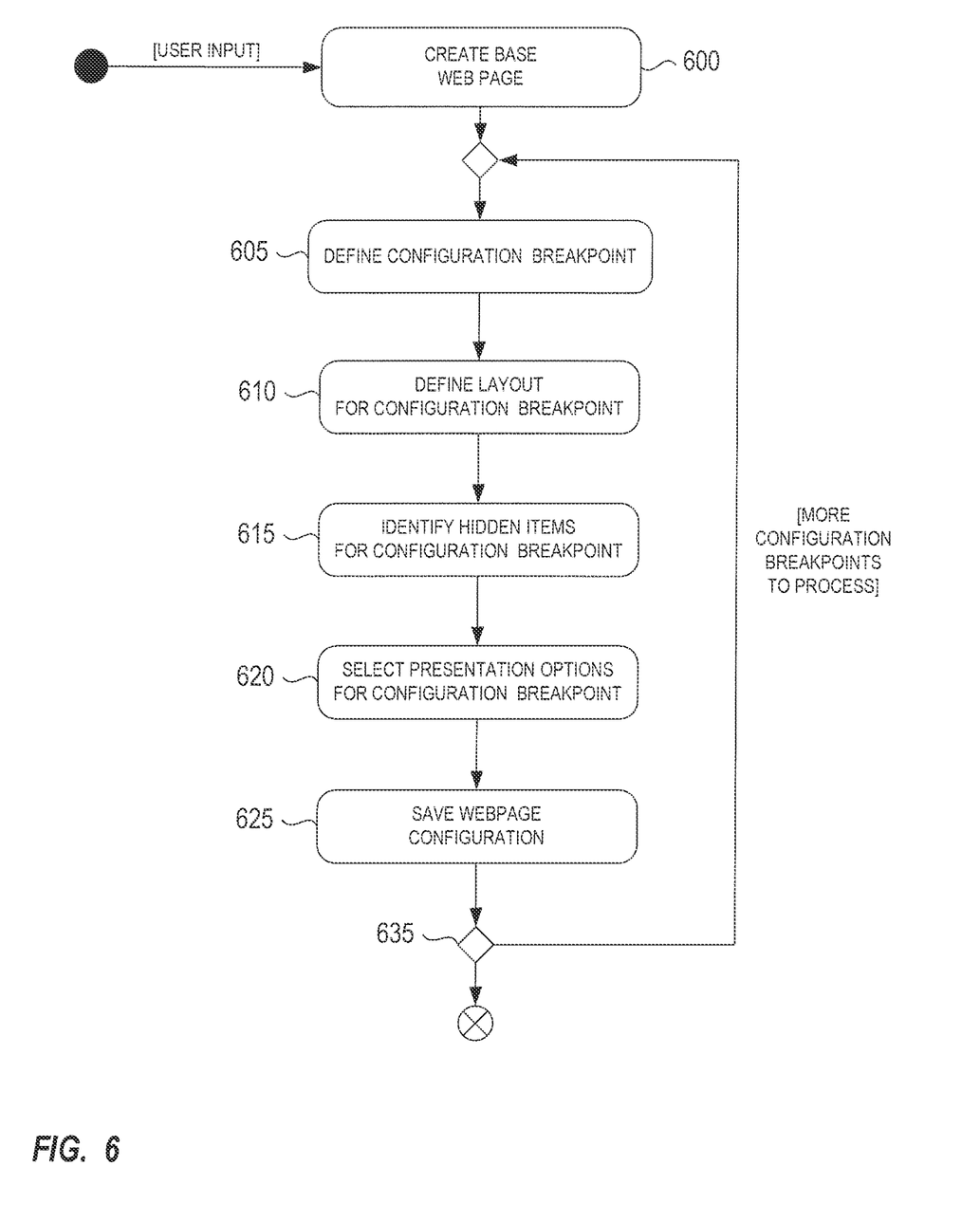
FIG. 6 is an activity diagram of creating a configuration breakpoint with a dynamic web editor system in accordance with multiple embodiments of the present disclosure.

FIG. 6 is an activity diagram illustrating an example workflow for generating and updating a webpage configuration breakpoint based on input provided by the user 110. At 600, a base web page is created in the DWE and any computing resources required for editing the webpage identified by the DWE system 100. This creation may include, for example, creating empty files associated with the webpage including, without limitation, HTML files, CSS files, and JavaScript files. Alternatively, the user 110 may wish to edit a webpage that was previously created and creation of the webpage at 600 may simply entail selecting the previously created webpage via, for example, a file selection box.

Once the base webpage has been created, at 605 a configuration breakpoint is defined either automatically by the DWE 105 based on the current display context or, alternatively, as a result of one or more commands received from the user 110. Next, at 610, the user 110 may define a webpage layout for the configuration breakpoint. In this way, the user can customize the presentation of webpage items at each configuration breakpoint. For example, the user 110 may define the placement of a content item on the webpage, the scale of an image as displayed on the webpage, or the font size used to render a text content item on the webpage.

At 615, the user can identify items that should be shown hidden for a particular configuration breakpoint. For example, the user may desire to hide large images or videos at certain configuration breakpoints to allow for quicker loading of the webpage in mobile environments. Then, at 620, the user can select one or more presentation options for the content items displayed in the webpage at the configuration breakpoint. For example, in some embodiments, the user can specify that an image should be resized proportionately as a browser window is resized. Thus, for example, the image may load in its original size, and scale if the viewing area becomes narrower than the image's original width. Finally, at 625, the configuration breakpoint is saved.

Figure 7:
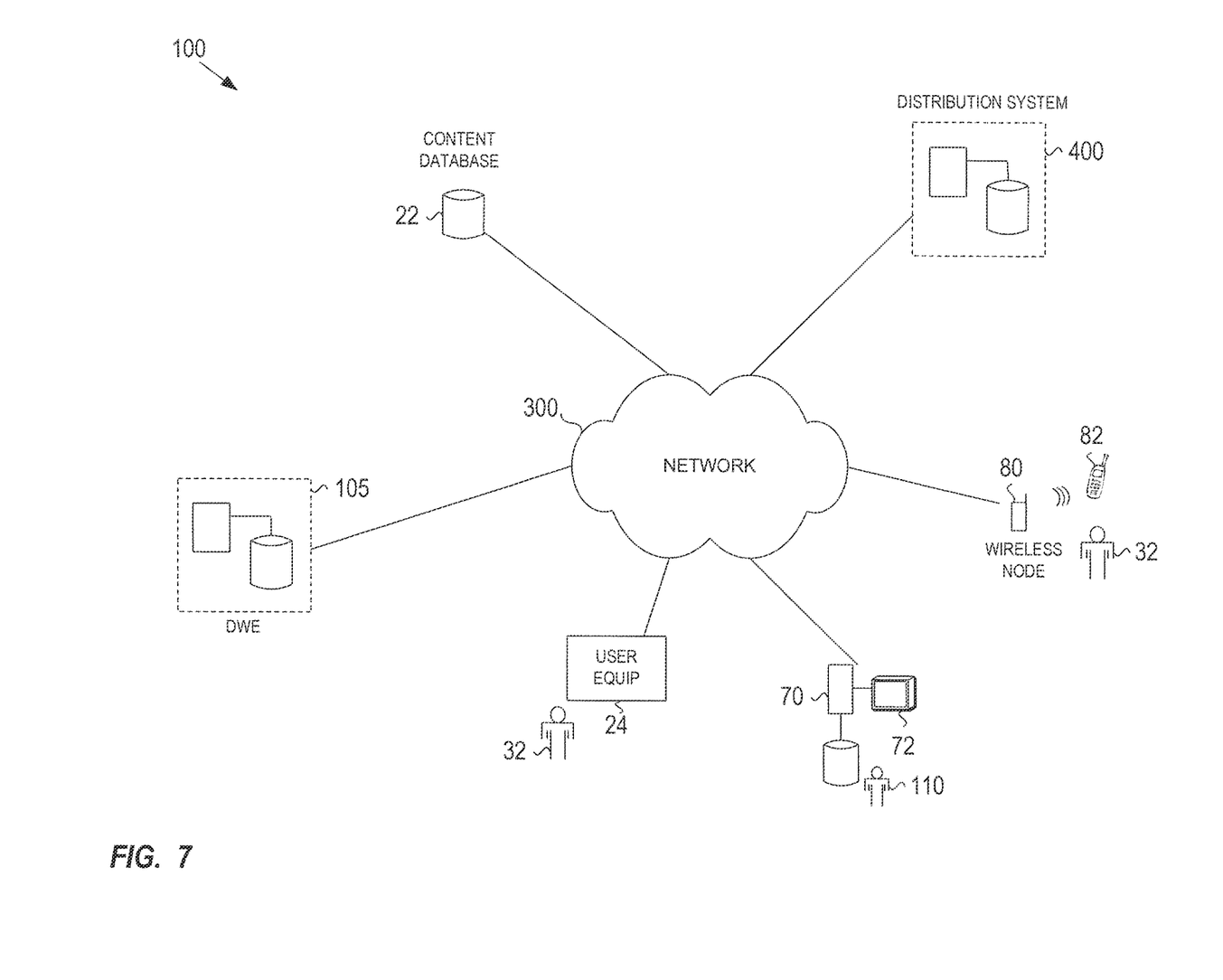
FIG. 7 is a system diagram of a dynamic web editor system in accordance with multiple embodiments of the present disclosure.

FIG. 7 is a network/system diagram of the DWE system 100 that includes the DWE 105, the content database 22 and the distribution system 400. As discussed previously, the DWE 105 may interact with the content database 22 to retrieve, create, edit and/or store adaptive webpages. Those skilled in the art will understand that the DWE 105 may interface with multiple content databases 22 without departing from the spirit and scope of the present disclosure. Similarly, the DWE 105 may contain one or more internal content databases 22. As discussed, the DWE 105 interfaces with the distribution system 400 to publish and/or distribute its webpages (e.g., via the network 300) to other systems and networks.

In one embodiment, the DWE 105 distributes webpages to mobile users 32 using handheld or portable devices 82 (e.g., smartphones, tablets, etc.) via a wireless network 80. The DWE 105 may provide webpages over the network 300 to other network systems or to user equipment 34, which may include PC's with attached monitors (not shown), displaying Internet browsers or other applications operated by users. The user equipment 34 also includes portable devices, such as laptop computers, cell phones, smart phones, PDA's, or any other networked communication device understood in the art. The DWE 105 may provide the webpages to a PC or server, or distributed servers (not shown). It could use commercial or open source database platforms such as Oracle, Microsoft SQL Server, MySQL, or PostgreSQL. The DWE 105 may provide external communication through database connections, custom interfaces, or a web application server, or any other communications medium or system generally known in the art.

A user or subscriber 110 may interact with the DWE system 100 via a user system 70 using hardware and software tools 72 to navigate through graphical and/or textual display of the DWE 105. The information may also be provided as an e-mail or instant message indicating qualitative and quantitative information related to the creation and/or modification of webpages. As described above, the DWE 105 may be customized for each user 110 (e.g., see FIG. 2). Portions or all of the components of the DWE system 100, including the DWE 105, may be implemented via Internet or networked servers (not shown), in the form of a simple PC, a web server, a combination of separate web server, application server, and database server, or other arrangement of server resources.

The network 300 may be any network or system generally known in the art, including the Internet, an intranet, a local area network (LAN), a wide area network (WAN), a metropolitan area network (MAN), a Personal Area Network (PAN), a direct connection or series of connections, or any other interconnection of computers capable of facilitating communication between the devices, modules and other components of the DWE system 100. Computers in the network may communicate via one or more transmission channels utilizing wired communication mediums, wireless communication mediums, or a combination thereof. Wired connections may be implemented using Ethernet, Universal Serial Bus (USB), High-Definition Multimedia Interface (HDMI), Thunderbolt, PCI Express, RJ-11 or any other wired connection interface technology generally known in the art. Wireless connections may be implemented using infrared, radio (e.g., Wi-Fi, Bluetooth, cellular, and/or satellite) or any other wireless connection methodology generally known in the art. The network may be implemented using any network topology known in the art including, for example, client-server, peer-to-peer, point-to-point, bus, ring, star, tree, and mesh topologies. Additionally, several networks may work alone or in communication with each other to facilitate communication in the network 300. Various networking standards may be employed for allowing the DWE system 100 and the various components and devices interacting therewith to communicate with the network 300, such as Ethernet, Fast Ethernet, Gigabit Ethernet, Fiber Distributed Data Interface (FDDI), WiMAX, EDGE, 3G, LTE, Bluetooth, Wireless USB, ZigBee, Near Field Communication (NFC) and/or 802.11 (Wi-Fi). The architecture and technology utilized by the network 300 may be selected and configured to create an infrastructure supporting one or more services including, for example, Internet service, cable television service, and telephony services.

Figure 8:
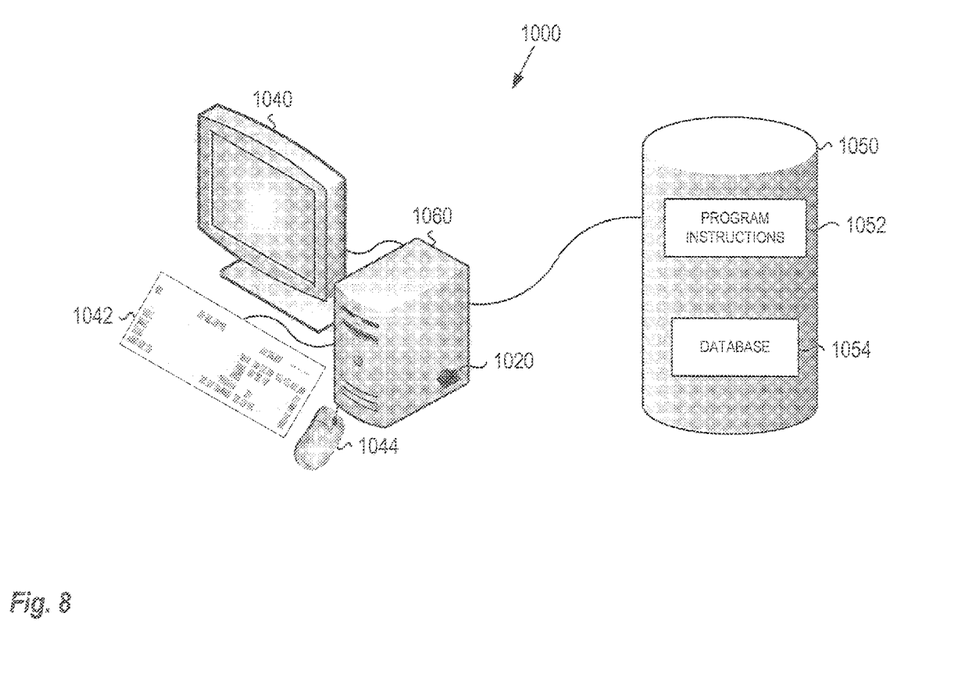
FIG. 8 is a block diagram of a computer system for realization of the dynamic web editor system of FIG. 1.

FIG. 8 is a block diagram illustrating a computer system 1000 for realization of a computer-implemented apparatus that may form all or a portion of one or more implementation(s) or embodiment(s) of the present disclosure. The computer system 1000 includes a computer 1060, a keyboard 1042, a mouse 1044, and a display device (e.g., computer monitor) 1040 through which the computer 1060 may receive input/provide output, for example to a user, operator or another computer or system (not shown). Input/output devices such as the display device 1040, keyboard 1042, the mouse 1044, and other means or mechanisms (e.g., touch screen interface) through which interaction with the computer system 1000 may occur are generally known in the art, and a detailed discussion thereof is omitted here for convenience only and should not be considered limiting. The computer 1060 includes a network port 1020 for connecting the computer to an internal or external network, such as, for example the network 300. The computer 1060 is connected to a storage device 1050 that includes program instructions 1052 for software application(s) that provides the logical functions of the computer-implemented apparatus and/or method(s) of the present disclosure. The storage device 1050 also contains a database 1054 for storing data.

Those skilled in the art will recognize that the program instructions 1052 for software applications implementing all or a portion of one or more embodiment(s) of the present disclosure may be written in a programming language such as Java or C++, and that the database 1054 may be implemented with a database package such as Microsoft Access™ or a database management system (DBMS) such as Microsoft SQL Seiver™, Microsoft SQL Server CE™, IBM DB2™, mySQL or postgreSQL.

Figure 9:
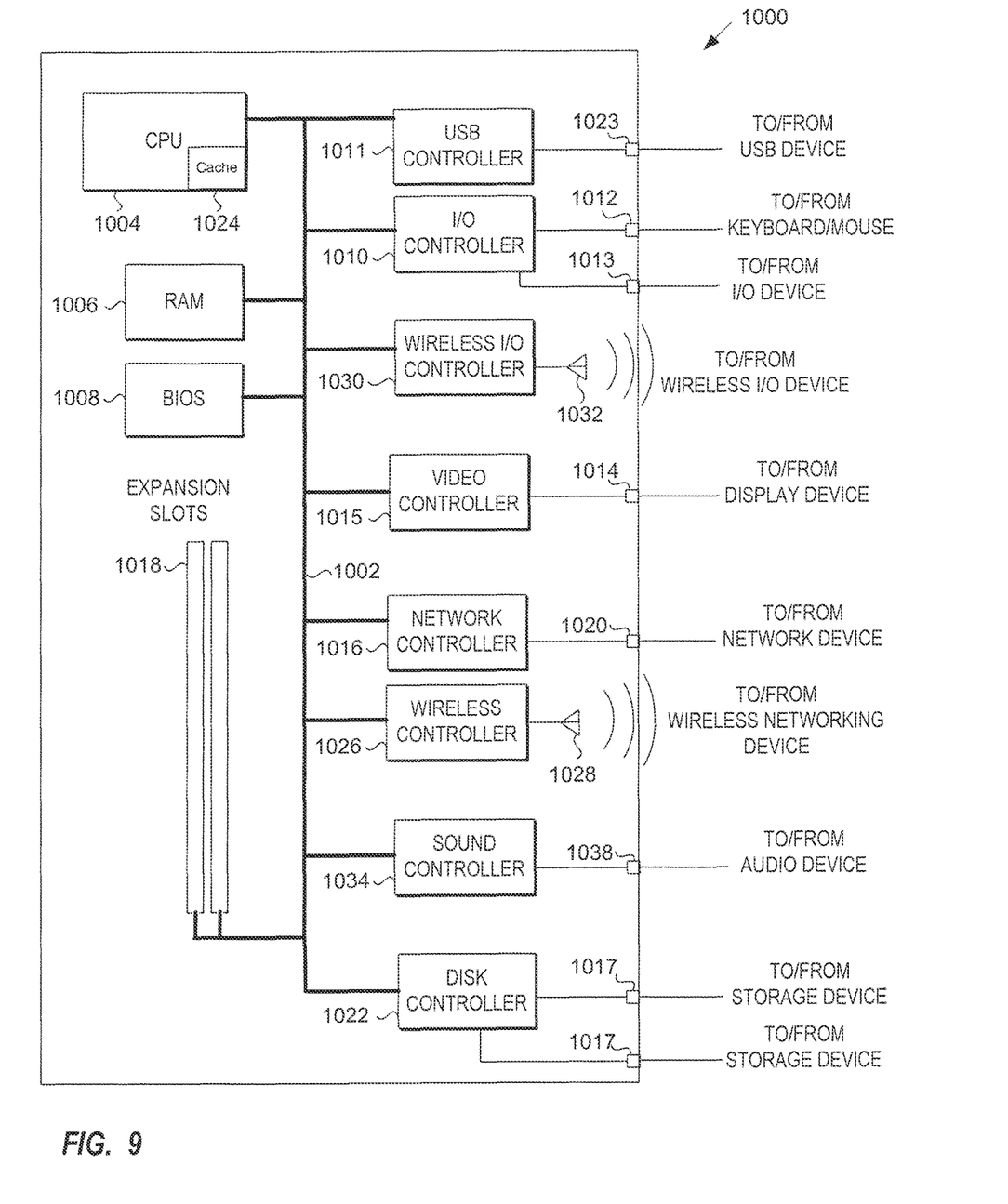
FIG. 9 is a block diagram of a computer system for realization of the dynamic web editor system of FIG. 1.

FIG. 9 is a block diagram illustrating a computer architecture of the system 1000 through which the embodiments of the DWE system 100, including the DWE 105, may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive (HDD), optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and/or pointing device (e.g., mouse, touch pad) (see FIG. 8) can be connected to the keyboard/mouse port(s) 1012, and other I/O devices could be connected to additional I/O port(s) 1013, which are connected to the system bus 1002 through the I/O controller 1005. Additional ports or devices, such as serial ports, parallel ports, firewire adapters, or biometric devices (not shown), may be utilized through the I/O controller 1010. A display device (see FIG. 8) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and/or an internal or external battery. These devices are generally well-know to those skilled in the art, and a detailed discussion thereof is omitted here for convenience only and should not be considered limiting.

The embodiments of the present disclosure may be implemented with any combination of hardware and software. If implemented as a computer-implemented apparatus, the present disclosure is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

The invention claimed is:

1. A method of creating and previewing a webpage including one or more content items using a computer operating as webpage editor, the method comprising:

receiving a first request comprising a first content layout for the webpage and indicia of one or more first device characteristics that describe at least one of hardware, software, or network configuration of a first device to be emulated in previewing the webpage;

generating, by the computer, a plurality of first style rules including an indication that at least one of the one or more content items is hidden based on the received indicia of one or more first device characteristics, wherein the plurality of first style rules define how the first content layout is to be displayed on a device having the first device characteristics;

receiving, by the computer, a user designation regarding a preview status of the at least one hidden content item, the preview status being at least one of: positive, or negative;

rendering a preview of the webpage based on the plurality of first style rules, the preview identifying the at least one hidden content item in the preview of the webpage upon the preview status being positive, the preview excluding the at least one hidden content item in the preview of the webpage upon the preview status being negative;

creating a first configuration breakpoint corresponding to the plurality of first style rules; and saving the first configuration breakpoint and the plurality of the first style rules in a style sheet corresponding to the webpage.

2. The method of claim 1, further comprising:

receiving a second request comprising a second content layout for the webpage and indicia of one or more second device characteristics that describe at least one of hardware, software, or network configuration of a second device to be emulated in previewing the webpage;

generating, by the computer, a plurality of second style rules that define how the second content layout should be displayed on a device having the second device characteristics based on the received indicia of one or more second device characteristics;

rendering a second preview of the webpage based on the second style rules;

creating a second configuration breakpoint corresponding to the second style rules; and saving the second style rules in the style sheet corresponding to the webpage.

3. The method of claim 1, further comprising:

receiving a third request comprising the first content layout for the webpage and indicia of one or more third device characteristics that describe at least one of hardware, software, or network configuration of a third device, wherein the third device characteristics are distinct from the first device characteristics;

updating the plurality of first style rules based on the one or more third device characteristics; and rendering a third preview of the webpage based on the updated plurality of first style rules.

4. The method of claim 3, further comprising:

rendering the webpage on a device having at least some of the third device characteristics based on the updated plurality of first style rules.

5. The method of claim 1, further comprising:

receiving a new request to modify the first configuration breakpoint with an updated style rule;

determining the plurality of first style rules associated with the first configuration breakpoint; and updating the plurality of first style rules based on the updated style rule.

6. The method of claim 1, further comprising:

rendering the preview of the webpage based on characteristics of a web browser used by the first device.

7. The method of claim 1, wherein the one or more first device characteristics comprise at least one of a screen height or a screen width of the first device.

8. The method of claim 1, wherein the one or more first device characteristics comprise interfaces in which the first device interacts with the webpage, wherein the rendered preview of the webpage is further based on a selected interface of the interfaces.

9. The method of claim 1, further comprising transferring at least one version of the webpage to a web server for publication of the at least one version of the webpage.

10. The method of claim 1, wherein the preview of the webpage is rendered in a device emulator window providing an imitation of a display provided by the first device.

11. An article of manufacture for creating and previewing a webpage including one or more content items using a computer operating as a webpage editor, the article of manufacture comprising a non-transitory computer-readable medium holding computer-executable instructions for performing a method comprising:

receiving a first request comprising a first content layout for the webpage and indicia of one or more first device characteristics that describe at least one of hardware, software, or network configuration of a first device to be emulated in previewing the webpage;

generating, by the computer, a plurality of first style rules, including an indication that at least one of the one or more content items is hidden based on the received indicia of one or more first device characteristics, wherein the plurality of first style rules define how the first content layout should be displayed on a device having the first device characteristics;

receiving, by the computer, a user designation regarding a preview status of the at least one hidden content item, the preview status being at least one of: positive, or negative;

rendering a preview of the webpage based on the plurality of first style rules, the preview identifying the at least one hidden content item in the preview of the webpage upon the preview status being positive, the preview excluding the at least one hidden content item in the preview of the webpage upon the preview status being negative;

creating a first configuration breakpoint corresponding to the plurality of first style rules; and saving the first configuration breakpoint and the plurality of first style rules in a style sheet corresponding to the webpage.

12. The article of manufacture of claim 11, wherein the method further comprises:

receiving a second request comprising a second content layout for the webpage and indicia of one or more second device characteristics that describe at least one of hardware, software, or network configuration of a second device to be emulated in previewing the webpage;

automatically generating, by the computer, a plurality of second style rules that define how the second content layout should be displayed on a device having the second device characteristics based on the received indicia of one or more second device characteristics;

rendering a second preview of the webpage based on the second style rules;

creating a second configuration breakpoint corresponding to the second style rules; and saving the second style rules in the style sheet corresponding to the webpage.

13. The article of manufacture of claim 11, wherein the method further comprises:

receiving a third request comprising the first content layout for the webpage and indicia of one or more third device characteristics that describe at least one of hardware, software, or network configuration of a third device, wherein the third device characteristics are distinct from the first device characteristics; and updating the plurality of first style rules based on the third device characteristics; and rendering a third preview of the webpage based on the updated plurality of first style rules.

14. The article of manufacture of claim 13, wherein the method further comprises:
    rendering the webpage on a device having at least some of the third device characteristics based on the updated plurality of first style rules.

15. The article of manufacture of claim 11, wherein the method further comprises:
    receiving a new request to modify the first configuration breakpoint with an updated style rule;
    determining the plurality of first style rules associated with the first configuration breakpoint; and
    updating the plurality of first style rules based on the updated style rule.

16. A system for creating a webpage including one or more content items using a computer operating as a webpage editor, the system comprising:
    a processor configured to:
        receive a first request comprising a first content layout for the webpage and indicia of one or more first device characteristics that describe at least one of hardware, software, or network configuration of a first device to be emulated in previewing the webpage;
        generate a plurality of first style rules, including an indication that at least one of the one or more content items is hidden, that define how the first content layout should be displayed on a device having the first device characteristics based on the received indicia of one or more first device characteristics;
        receive a user designation regarding a preview status of the at least one hidden content item, the preview status being at least one of: positive, or negative;
        render a preview of the webpage based on the plurality of first style rules, the preview identifying the at least one hidden content item in the preview of the webpage upon the preview status being positive, the preview excluding the at least one hidden content item in the preview of the webpage upon the preview status being negative; and
        create a first configuration breakpoint corresponding to the plurality of first style rules; and
    a database configured to save the first configuration breakpoint and the plurality of first style rules in a style sheet corresponding to the webpage.

17. The system of claim 16, wherein;
    the processor is further configured to:
        receive a second request comprising a second content layout for the webpage and indicia of one or more second device characteristics that describe at least one of hardware, software, or network configuration of a second device to be emulated in previewing the webpage; and
        generate a plurality of second style rules that define how the first content layout should be displayed on a device having the first device characteristics based on the received indicia of one or more second device characteristics, render a second preview of the webpage based on the second style rules, and create a second configuration breakpoint corresponding to the second style rules; and
    wherein the database is further configured to save the second style rules in the style sheet corresponding to the webpage.

18. The system of claim 17,
    wherein the processor is further configured to receive a third request comprising the first content layout for the webpage and indicia of one or more third device characteristics that describe at least one of hardware, software, or network configuration of a third device, wherein the third device characteristics are distinct from the first device characteristics, and wherein the processor is further configured to update the plurality of first style rules based on the third device characteristics.

19. The system of claim 18, wherein a second processor is further configured to render the webpage on a device having at least some of the third device characteristics in accordance with the updated plurality of first style rules.

20. The system of claim 16, wherein the processor is further configured to receive a new request to modify the first configuration breakpoint with an updated style rule, and to determine the plurality of first style rules associated with the first configuration breakpoint and update the plurality of first style rules based on the updated style rule.

* * * * *